(12) United States Patent
Shimizu (10) Patent No.: US 11,708,764 B2
(45) Date of Patent: Jul. 25, 2023

(54) METHOD OF MANUFACTURING TIAL ALLOY IMPELLER AND TIAL ALLOY IMPELLER

(71) Applicant: KABUSHIKI KAISHA TOYOTA JIDOSHOKKI, Kariya (JP)

(72) Inventor: Tatsuya Shimizu, Aichi-ken (JP)

(73) Assignee: KABUSHIKI KAISHA TOYOTA JIDOSHOKKI, Kariya (JP)

(*) Notice: Subject to any disclaimer, the term of this patent is extended or adjusted under 35 U.S.C. 154(b) by 0 days.

(21) Appl. No.: 17/292,350

(22) PCT Filed: Oct. 25, 2019

(86) PCT No.: PCT/JP2019/041810
§ 371 (c)(1),
(2) Date: May 7, 2021

(87) PCT Pub. No.: WO2020/100550
PCT Pub. Date: May 22, 2020

(65) Prior Publication Data
US 2022/0003122 A1 Jan. 6, 2022

(30) Foreign Application Priority Data
Nov. 13, 2018 (JP) .................. 2018-212845

(51) Int. Cl.
*F01D 5/28* (2006.01)
*B22F 5/04* (2006.01)
(Continued)

(52) U.S. Cl.
CPC ............. *F01D 5/28* (2013.01); *B22D 21/005* (2013.01); *B22D 25/02* (2013.01); *B22F 3/105* (2013.01);
(Continued)

(58) Field of Classification Search
CPC ........... F05D 2220/40; F05D 2300/174; F05D 2230/25; F05D 2230/10; F05D 2230/21;
(Continued)

(56) References Cited

U.S. PATENT DOCUMENTS 6,588,485 B1  7/2003  Decker
7,117,596 B2 * 10/2006  Ohishi ................ F02B 37/24
                                                          29/889.7
(Continued)

FOREIGN PATENT DOCUMENTS

JP    2004-052754 A    2/2004
JP    2011-174096 A    9/2011
(Continued)

*Primary Examiner* — Eric J Zamora Alvarez
(74) *Attorney, Agent, or Firm* — Sughrue Mion, PLLC (57) ABSTRACT

A method of manufacturing a TiAl alloy impeller includes a blank preparation step in which a blank of the TiAl alloy impeller is prepared, wherein the blank has a shaft portion and a plurality of blades, and a thickness of an outer edge of each of the blades of the blank is set so as to be larger than a thickness of an outer edge of a blade of the TiAl alloy impeller, and an additional work step in which an additional work is performed on each of the blades of the blank. In the additional work step, the additional work is performed on a first surface of a portion that includes at least the outer edge of each of the blades or the first surface and a second surface of the portion thereof.

13 Claims, 5 Drawing Sheets

(51) Int. Cl.
  *B23P 15/02* (2006.01)
  *B23P 15/00* (2006.01)
  *B33Y 40/20* (2020.01)
  *B22D 21/00* (2006.01)
  *B22D 25/02* (2006.01)
  *B22F 3/105* (2006.01)
  *B23K 101/00* (2006.01)
  *B23K 103/14* (2006.01)
  *B23K 26/00* (2014.01)

(52) U.S. Cl.
  CPC .............. *B22F 5/04* (2013.01); *B23P 15/006* (2013.01); *B23P 15/02* (2013.01); *B22F 2998/10* (2013.01); *B23K 26/0006* (2013.01); *B23K 2101/001* (2018.08); *B23K 2101/006* (2018.08); *B23K 2103/14* (2018.08); *F05D 2220/40* (2013.01); *F05D 2230/211* (2013.01); *F05D 2230/234* (2013.01); *F05D 2230/25* (2013.01); *F05D 2300/174* (2013.01); *Y10T 29/4932* (2015.01)

(58) Field of Classification Search
  CPC ........... F05D 2230/11; F05D 2230/211; F05D 2230/234; F05D 2230/42; Y10T 29/49316; Y10T 29/49995; Y10T 29/49336; Y10T 29/4932; B21K 3/04; B23P 15/006; B23P 15/02; C22C 14/00; F02C 6/12; F01D 5/141; F01D 5/12; F01D 5/28; B22F 5/04; B22F 3/105; B22F 2998/10; B33Y 80/00; B22D 21/005; B22D 25/02
  See application file for complete search history.

(56) References Cited

U.S. PATENT DOCUMENTS

| | | | |
|---|---|---|---|
| 7,278,461 B2 * | 10/2007 | Endo | B22C 9/22 164/76.1 |
| 10,001,012 B2 | 6/2018 | Scherrer et al. | |
| 2010/0247764 A1 * | 9/2010 | Watanabe | C22C 14/00 427/248.1 |
| 2015/0283656 A1 * | 10/2015 | Scherrer | B21K 1/36 29/889 |
| 2016/0053616 A1 * | 2/2016 | Scherrer | F02B 37/00 416/223 A |
| 2018/0290239 A1 * | 10/2018 | Haro Gonzalez | B23K 26/082 |

FOREIGN PATENT DOCUMENTS

| | | |
|---|---|---|
| JP | 2016-514798 A | 5/2016 |
| JP | 2018-094817 A | 6/2018 |

* cited by examiner

METHOD OF MANUFACTURING TIAL ALLOY IMPELLER AND TIAL ALLOY IMPELLER

CROSS-REFERENCE TO RELATED APPLICATIONS

This application is a National Stage of International Application No. PCT/JP2019/041810 filed Oct. 25, 2019, claiming priority based on Japanese Patent Application No. 2018-212845 filed Nov. 13, 2018, the contents of all of which are incorporated herein by reference in their entirety.

TECHNICAL FIELD

This invention relates to a method of manufacturing a TiAl alloy impeller and the TiAl alloy impeller.

BACKGROUND ART

Publication of PCT Application No. 2016-514798 (hereinafter, called Patent Document 1) discloses a turbine wheel of a turbocharger manufactured by casting a TiAl alloy. The turbine wheel has a hub that is rotatable around a rotary shaft and a plurality of turbine blades that is connected to the hub.

CITATION LIST

Patent Document

Patent Document 1: Publication of PCT Application No. 2016-514798

SUMMARY OF INVENTION

Technical Problem

Generally speaking, an impeller such as a turbine wheel that is used for a supercharger is formed in such a manner that an outer edge of the impeller in a radial direction thereof is thinnest so as to improve efficiency of the impeller. When a TiAl alloy is selected as a material of the impeller, and the impeller that has blades corresponding to a required shape is manufactured by casting, a defect occurs, such as a chip in outer edges of the blades of a cast product, thereby reducing a yield of the impeller. It is required that a thickness of the outer edge of each blade is made larger relative to a required value so as to suppress occurrence of the defect. However, this reduces the efficiency of the impeller.

In addition, even when manufacturing the impeller made of a TiAl alloy by other methods such as forging, metal injection molding (MIM), and laser metal deposition (LMD), the thickness of the outer edge of each blade is larger relative to the required value because of a restriction on machining accuracy, etc. of each manufacturing method, similarly to the thickness of the outer edge of the blade manufactured by the casting.

On the other hand, there is a need for increasing productivity of the impeller that is made of the TiAl alloy. However, it is difficult to achieve both of manufacturing the impeller that is made of the TiAl alloy and has the blades corresponding to the required shape, and improving the productivity of the impeller by the above methods.

It is an objective of the present invention to provide a method of manufacturing a TiAl alloy impeller by which each of the blades of the TiAl alloy impeller is formed so as to has a thickness corresponding to a required value while productivity of the TiAl alloy impeller is increased, and the TiAl alloy impeller.

Solution to Problem

A method of manufacturing a TiAl alloy impeller according to this invention is a method of manufacturing a TiAl alloy impeller that is used for a vehicle turbocharger. The method of manufacturing the TiAl alloy impeller includes a blank preparation step in which a blank of the TiAl alloy impeller is prepared wherein the blank has a shaft portion configured to rotate around a rotational axis and a plurality of blades connected to the shaft portion, and an additional work step in which an additional work is performed on each of the blades of the blank. A thickness of an outer edge in a radial direction of the shaft portion of each of the blades of the blank is set so as to be larger than a thickness of an outer edge of each of blades of a final product. In the additional work step, the additional work is performed on a first surface of a portion that includes at least the outer edge of the blade or the first surface and a second surface of the portion thereof so as to make the outer edge of the blade in the radial direction of the shaft portion of thin.

In the present manufacturing method, the additional work is performed on the first surface of the portion that includes at least the outer edge of each of the blades of the blank of the TiAl alloy impeller prepared in the blank preparation step or the first and second surfaces of the portion thereof. Thus, it is possible that in the blank preparation step, the blank having the blades is prepared, wherein the thickness of the portion that includes the outer edge of each of the blades is larger than the thickness of a required shape, and the thickness of the portion that includes the outer edge is made into the thickness of the required shape by the additional work. Therefore, while productivity of the TiAl alloy impeller is increased, the TiAl alloy impeller that has the blades corresponding to the required shape may be manufactured.

In the blank preparation step, the blank formed by precision casting may be prepared.

Preferably, in the additional work step, the additional work is performed on each of the blades so that at least a portion of a surface of the blade after the additional work remains a casting surface.

This reduces an area in which the additional work is performed, so that the additional work is simplified.

In the blank preparation step, the blank formed by forging may be prepared. In the blank preparation step, the blank formed by metal injection molding may be prepared. In the blank preparation step, the blank formed by metal laser deposition may be prepared.

Preferably, a first surface of each of the blades of the blank is a recess surface that is recessed so as to protrude in a circumferential direction of the shaft portion, and a second surface of each of the blades of the blank is a protruding surface that bulges so as to protrude in the circumferential direction of the shaft portion.

In this case, in the additional work step, the additional work may be performed on only the recess surface of the portion that includes the outer edge of each of the blades.

With this work, a performance of the TiAl alloy impeller is increased.

In the additional work step, the additional work may be performed on only the protruding surface of the portion that includes the outer edge of each of the blades.

In this aspect, the additional work is performed on the portion of the protruding surface that is less susceptible to exhaust gas, so that reliability of the TiAl alloy impeller is increased.

In the additional work step, the additional work may be performed on both of the protruding surface and the recess surface of the portion that includes the outer edge of each of the blades.

In this aspect, the blades may be further uniformly spaced apart.

Preferably, each of the blades has a one-side edge that is located on one side in an axial direction of the shaft portion.

In this case, the portion that includes the outer edge may be, of each of the blades, a portion from the outer edge to a portion that is offset toward the shaft portion by one third of a length of the one-side edge from the outer edge.

This achieves both of increasing a yield of the blank and simplifying the additional work.

The portion that includes the outer edge may be, of each of the blades, a portion outward of a straight line in the radial direction of the shaft portion, wherein the straight line is parallel with the rotational axis, and extends through a portion of the one-side edge that is offset toward the shaft portion by a half of a length of the one-side edge in the radial direction of the shaft portion from an outer end of the blade in the radial direction of the shaft portion.

This also achieves both of increasing the yield of the blank and simplifying the additional work.

The additional work may be a cutting work. In addition, the additional work may be an electrochemical machining.

Preferably, the method of manufacturing the TiAl alloy impeller further includes a surface treatment step that follows the additional work step, and in which a fluorination treatment is performed on a surface of the TiAl alloy impeller after the additional work.

Thus, oxidation residence of the surface of the TiAl alloy impeller is increased.

The TiAl alloy impeller according to this invention is a TiAl alloy impeller that is made of a TiAl alloy and mounted on a vehicle turbocharger. The TiAl alloy impeller includes a shaft portion that is configured to rotate around a rotational axis and has a shape in which a diameter of the shaft portion gradually increases as the shaft portion extends in a rotational axis direction of the rotational axis from one side toward the other side, and a plurality of blades connected to the shaft portion. The shaft portion and the plurality of blades are integrally formed of a cast. Each of the blades of the plurality of the blades includes an outer edge that is an outer edge in a radial direction of the shaft portion. A portion of the blade that includes the outer edge has a machined face.

Preferably, each of the blades further has a casting face formed of a casting surface. A thickness of a portion of the blade that has the machined face is smaller than a thickness of a portion of the blade that has the casting face.

Preferably, the casting face and the machined face extend continuously.

This suppresses generation of stress that is concentrated in a boundary portion between the casting face and the machined face.

Advantageous Effects of Invention

As described above, according to this invention, the method of manufacturing a turbine wheel that may improve a yield of a manufactured product and the turbine wheel may be provided.

DESCRIPTION OF EMBODIMENTS

The following will describe an embodiment of the present invention with reference to the accompanying drawings. It is noted that identical or substantially identical components have the same reference numerals in the drawings referred to below.

The following will describe a method of manufacturing a TiAl alloy impeller according to an embodiment of the present invention with reference to the accompanying drawings. The method of manufacturing this TiAl alloy impeller includes a blank preparation step in which a blank 1 of the TiAl alloy impeller is prepared and an additional work step in which an additional work is performed on the blank 1. A TiAl alloy impeller 2 that is manufactured by the present manufacturing method is, for example, used as an impeller (a turbine wheel and a compressor wheel) of a turbocharger that is mounted on a vehicle.

Figure 1:
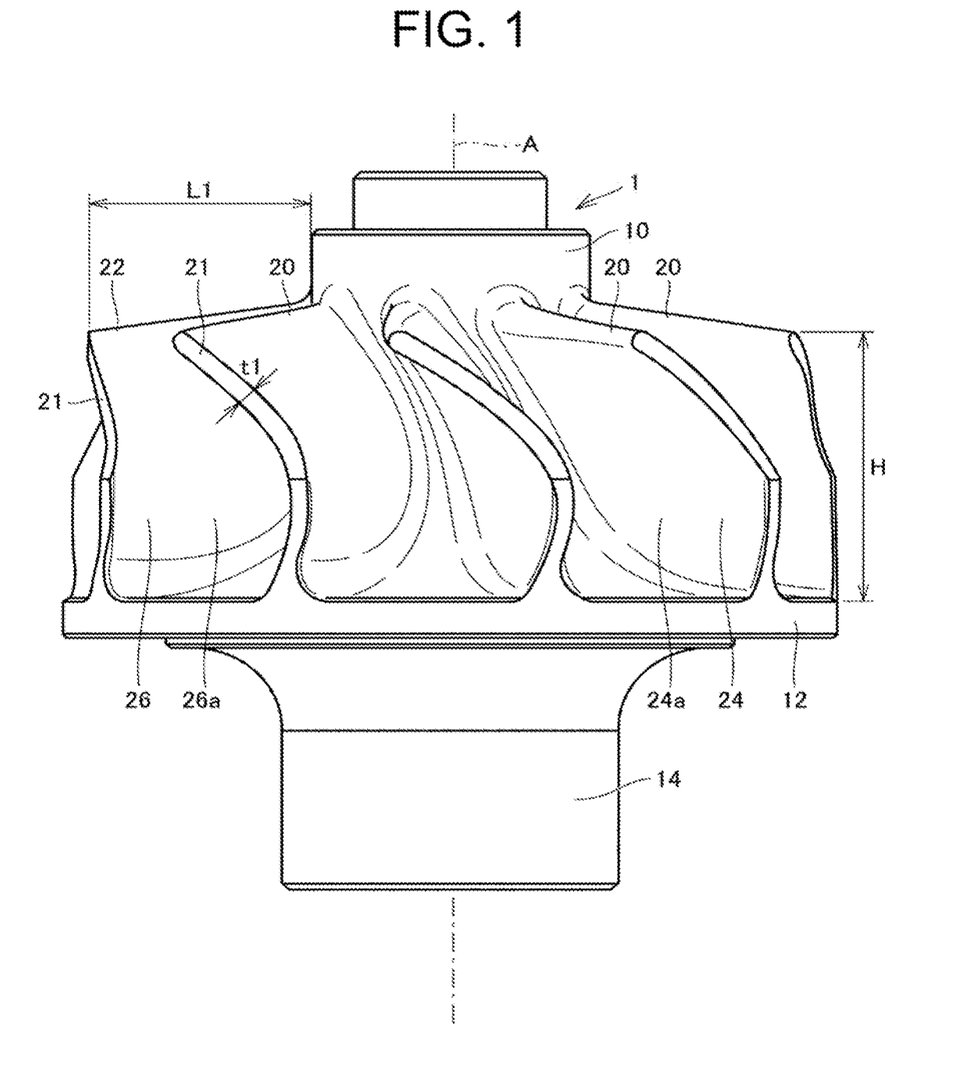
FIG. 1 is a side view of a blank of a TiAl alloy impeller according to an embodiment of the present invention.
Figure 2:
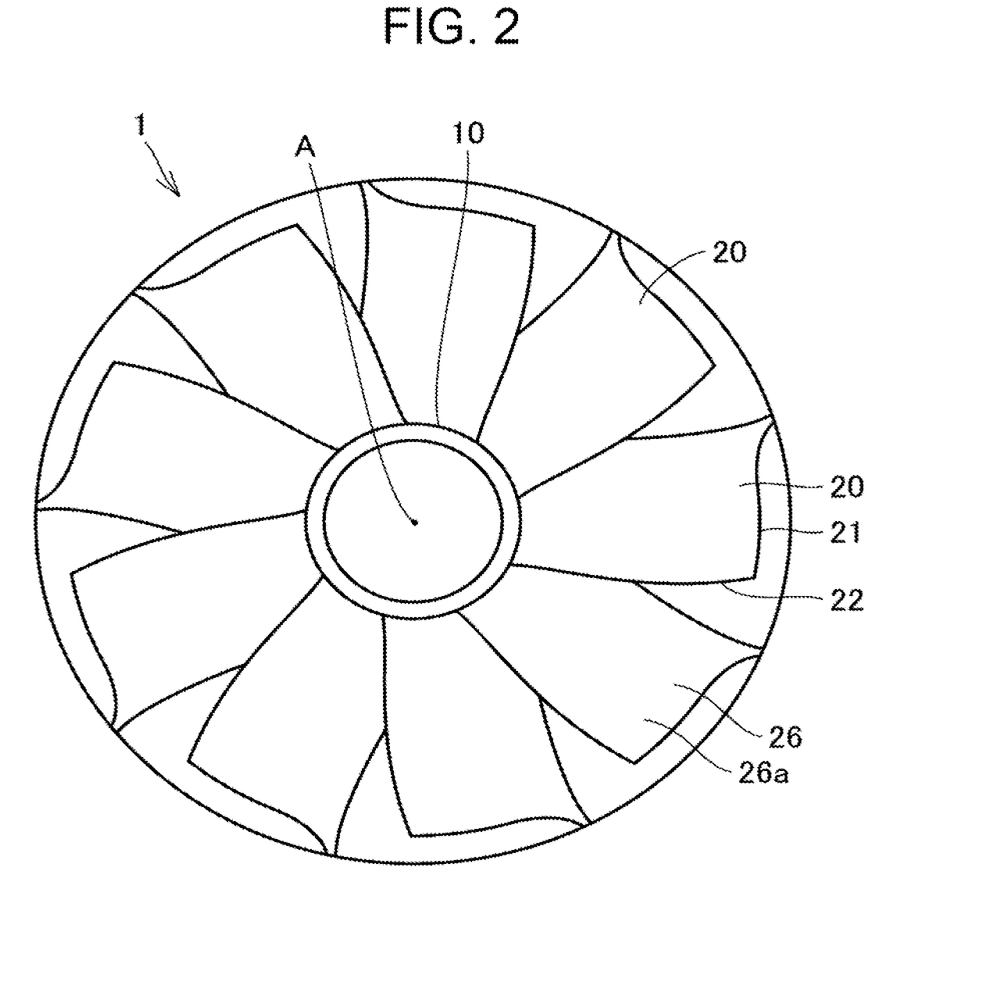
FIG. 2 is a plan view of the blank illustrated in FIG. 1.

FIG. 1 is a side view of the blank of the TiAl alloy impeller according to the embodiment of the present invention. FIG. 2 is a plan view of the blank illustrated in FIG. 1. That is, FIGS. 1 and 2 illustrate the blank 1 of the TiAl alloy impeller that is prepared in the blank preparation step. It is noted that a turbine wheel is illustrated as an example of the blank 1 of the TiAl alloy impeller in FIGS. 1 and 2.

In the blank preparation step, the blank 1 of the TiAl alloy impeller is prepared. The blank 1 is formed by casting a TiAl alloy, precision casting (lost-wax precision casting) of the TiAl alloy, forging the TiAl alloy, metal injection molding (MIM) of the TiAl alloy, laser metal deposition (LMD) of the TiAl alloy, sintering the TiAl alloy, etc. The following will describe the blank 1 formed by the precision casting of the TiAl alloy as an example. In the present embodiment, a material with an Al content of 30 wt % to 48 wt % is used as the TiAl alloy.

As illustrated in FIGS. 1 and 2, the blank (a cast product in the present embodiment) 1 has a shaft portion 10 and a plurality of blades 20. The shaft portion 10 and the blades 20 are integrally formed of a cast.

The shaft portion 10 is rotatable around a rotational axis A. The shaft portion 10 has a shape in which a diameter of the shaft portion 10 gradually increases as the shaft portion 10 extends in a rotational axis direction of the rotational axis A from one side (an upper side in FIG. 1) toward the other side (a lower side in FIG. 1). A disc portion 12 formed in a disc shape is connected to an end of the shaft portion 10 on the other side in the rotational axis direction. It is noted that a coupling portion 14 that is coupled to a rotor shaft (not illustrated) is connected to the disc portion 12.

Each of the blades 20 is connected to the shaft portion 10. The blade 20 has a shape in which the blade 20 is bent so as to protrude toward one side in a circumferential direction of the shaft portion 10. A first surface of the blade 20 is a recess surface 24 that is recessed so as to protrude in the circumferential direction of the shaft portion 10. A second surface of the blade 20 is a protruding surface 26 that bulges so as to protrude in the circumferential direction of the shaft portion 10. The recess surface 24 of the blank 1 is constituted by a casting face 24a formed of a casting surface, and the protruding surface 26 of the blank 1 is constituted by a casting face 26a formed of the casting surface. The blade 20 has an outer edge 21 and a one-side edge 22.

The outer edge 21 is an outer edge of each of the blades 20 in the radial direction of the shaft portion 10. A thickness t1 of the outer edge 21 is set so as to be larger than a thickness t2 of the outer edge 21 of the blade 20 in the TiAl alloy impeller 2 (see FIG. 3) that is a final product. The thickness t1 of the outer edge 21 of the blank 1 is preferably set to 0.8 mm to 2.0 mm. In the present embodiment, the thickness t1 of the outer edge 21 of the blank 1 is set to 1.2 mm. A height H of the outer edge 21 in a direction parallel with the rotational axis A is set to 18.7 mm. However, the thickness t1 and the height H of the outer edge 21 are not limited to these values.

The one-side edge 22 is an edge of each of the blades 20 that is located on the one side (the upper side in FIG. 1) in the axial direction of the shaft portion 10. The one-side edge 22 has a shape that extends toward the outer edge 21 from an outer peripheral surface of the shaft portion 10. In the present embodiment, a length L1 of the one-side edge 22 in the radial direction of the shaft portion 10 is set to 15 mm. However, the length L1 of the one-side edge 22 is not limited to this value.

Figure 3:
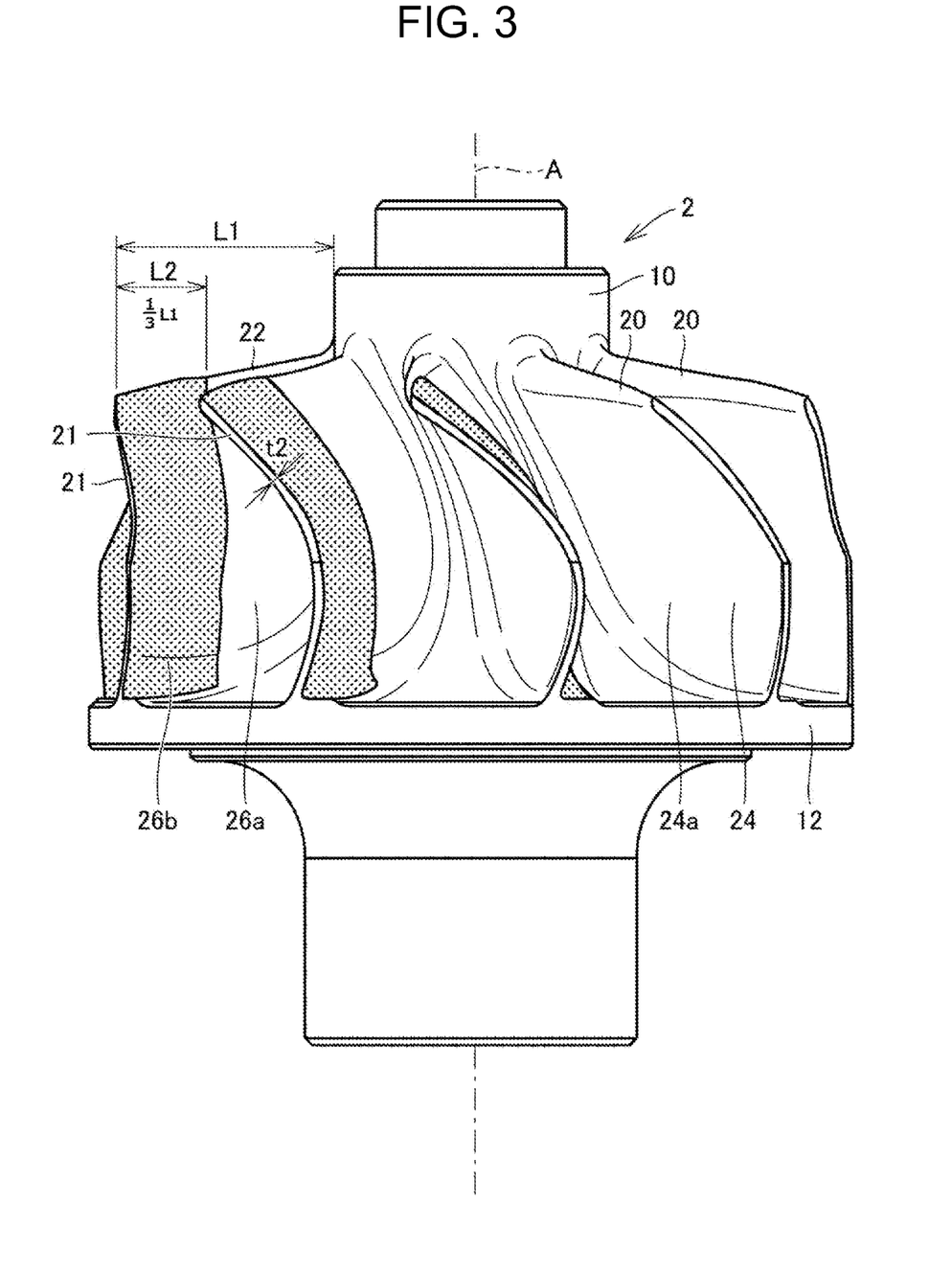
FIG. 3 is a side view of the TiAl alloy impeller manufactured by performing an additional work on the blank illustrated in FIG. 1.

Next, the following will describe the additional work step. In the additional work step, the additional work is performed on at least a portion of each of the blades 20. FIG. 3 is a side view of the TiAl alloy impeller manufactured by performing the additional work on the blank illustrated in FIG. 1. It is noted that a pattern is added to the portion on which the additional work is performed in FIG. 3. In the additional work step, the additional work is performed on a first surface of the portion that includes at least the outer edge 21 of the blade 20 or the first surface and a second surface of the portion thereof so as to make the outer edge 21 of the blade 20 thin. In the present embodiment, the additional work is performed on only the protruding surface 26 of the portion that includes at least the outer edge 21 of the blade 20. However, in the additional work step, the additional work may be performed on only the recess surface 24 of the portion that includes at least the outer edge 21 of the blade 20 or both surfaces (the recess surface 24 and the protruding surface 26) of the portion thereof.

A length L2 of the portion of each of the blades 20 on which the additional work is performed (the portion that includes the outer edge 21) in the radial direction of the shaft portion 10 is, for example, set to one third of the length L1 of the one-side edge 22.

One example of the additional work performed in the additional work step is a cutting work. The cutting work is performed by using an end mill, etc. However, the additional work may be an electrochemical machining. In the electrochemical machining, the blank 1 is set to an anode and a tool is set to a cathode. While an electrolyte is flowed between the blank 1 and the tool with the tool facing the portion of each of the blades 20 on which the additional work is performed, a DC voltage is applied between the blank 1 and the tool.

The thickness t2 of the outer edge 21 after the additional work is preferably set to 0.4 mm to 0.7 mm. In the present embodiment, the thickness t2 is set to 0.6 mm.

Of the protruding surface 26, the portion on which the additional work is performed (to which the pattern is added in FIG. 3) forms a machined face 26b. Condition of a surface of the machined face 26b is different from that of a surface of the casting face 26a. Surface roughness of the machined face 26b is smaller than that of the casting face 26a. Surface roughness Ra of the machined face 26b is, for example, about 0.2.

Figure 4:
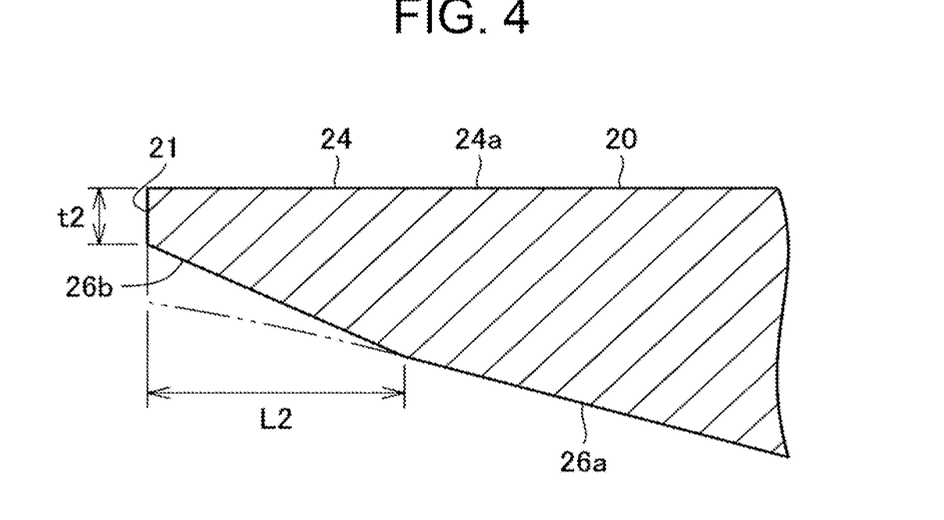
FIG. 4 is a cross-sectional view of each blade of the TiAl alloy impeller illustrated in FIG. 3.

FIG. 4 is a cross-sectional view of each blade of the TiAl alloy impeller illustrated in FIG. 3. This cross-section is a cross-section taken along a plane perpendicular to the rotational axis A. As illustrated in FIG. 4, the casting face 26a and the machined face 26b extend continuously. It is noted that in FIG. 4, a shape of the cross-section of each of the blades 20 before the additional work is performed is illustrated by a dashed-and-double-dotted line.

As described above, in the method of manufacturing the TiAl alloy impeller 2 according to the present embodiment, the additional work is performed on the first surface of the portion that includes at least the outer edge 21 of each of the blades 20 of the blank 1 of the TiAl alloy impeller prepared in the blank preparation step or the first and second surfaces of the portion thereof. Thus, it is possible that in the blank preparation step (for example, the step in which the blank 1 is formed by casting), the blank 1 having the blades 20 is prepared, wherein the thickness of the portion that includes the outer edge 21 of each of the blades 20 is larger than a thickness of a required shape, and the thickness of the portion that includes the outer edge 21 is made into the thickness of the required shape by the additional work. Therefore, while productivity of the TiAl alloy impeller 2 is increased, the TiAl alloy impeller 2 that has the blades 20 corresponding to the required shape may be manufactured.

In the additional work step, the additional work is performed on each of the blades 20 so that at least a portion of the surface of the blade 20 after the additional work remains the casting surface. This reduces an area in which the additional work is performed. Thus, the additional work is simplified.

In the additional work step, performance of the TiAl alloy impeller 2 is increased by performing the additional work on only the recess surface 24 of the portion that includes the outer edge 21 of each of the blades 20.

The protruding surface 26 of each of the blades 20 is less susceptible to exhaust gas, so that in the step in which the additional work is performed, reliability of the TiAl alloy impeller 2 is increased by performing the additional step on only the protruding surface 26 of the portion that includes the outer edge 21 of each of the blades 20.

In the additional work step, the blades 20 may be further uniformly spaced apart by performing the additional work on both of the recess surface 24 and the protruding surface 26 of the portion that includes the outer edge 21 of each of the blades 20.

The length L2 of the portion of each of the blades 20 on which the additional work is performed (the portion that includes the outer edge 21) in the radial direction of the shaft portion 10 is set to one third of the length L1 of the one-side edge 22 in the same direction as the radial direction of the shaft portion 10. This achieves both of increasing a yield of the blank (the cast product) 1 and simplifying the additional work (improving the productivity).

The casting face 26a and the machined face 26b extend continuously, so that generation of stress that is concentrated in a boundary portion between the casting face 26a and the machined face 26b is suppressed.

It is noted that in the blank preparation step of the above embodiment, when the blank 1 is formed by forging, a workpiece that is formed in a pillar shape is firstly heated, and the heated workpiece is forged, so that the blank 1 that has the blades 20 is formed, wherein the thickness t1 of the outer edge 21 of each of the blades 20 of the blank 1 is larger than the thickness t2 of the outer edge 21 of the blade 20 of the TiAl alloy impeller 2 being a final product. Thus, cracks of the blade 20 by the forging, etc. are suppressed.

When the blank 1 is formed by the metal injection molding, a deformation tolerance of each of the blades 20 in sintering corresponds to a machining tolerance of the blade 20 in the additional work step, so that the yield of the blank 1 is improved.

When the blank 1 is formed by the laser metal deposition (LMD), it is preferable that the shaft portion 10 is formed by machining work (the casting, the forging, etc.) of the TiAl alloy, and each of the blades 20 is formed by the laser metal deposition. Specifically, the shaft portion 10 is molten by a laser, and powder made of a TiAl alloy is injected into a fusion zone of the shaft portion 10 and thermally sprayed, so that each of the blades 20 is formed.

First Modified Embodiment

Figure 5:
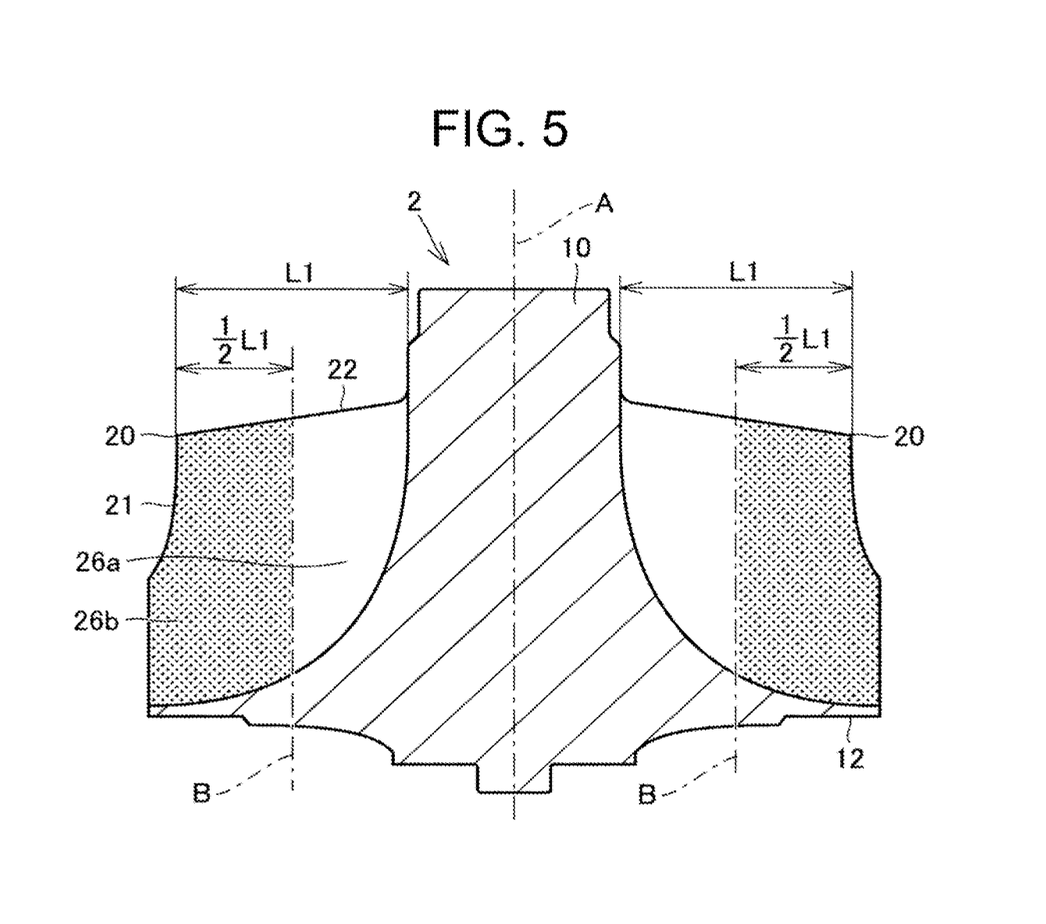
FIG. 5 is a view illustrating a modified embodiment of a portion on which the additional work is performed.

FIG. 5 is a view illustrating a first modified embodiment of the portion on which the additional work is performed. As illustrated in FIG. 5, in the additional work step, the additional work may be performed on a surface of a portion outward of a base straight line B in the radial direction of the shaft portion 10 of each of the blades 20 of the blank 1.

The base straight line B is a straight line parallel with the rotational axis A, and extends through a middle portion of the one-side edge 22 in the radial direction of the shaft portion 10 (of the one-side edge 22, a portion that is offset toward the shaft portion 10 by a half ½L1 of the length L1 of the one-side edge 22 in the radial direction of the shaft portion 10 from the outer end of each of the blade 20 in the radial direction of the shaft portion 10).

This aspect also achieves both of increasing the yield of the blank (the cast product) 1 and simplifying the additional work (improving the productivity).

Second Modified Embodiment

Figure 6:
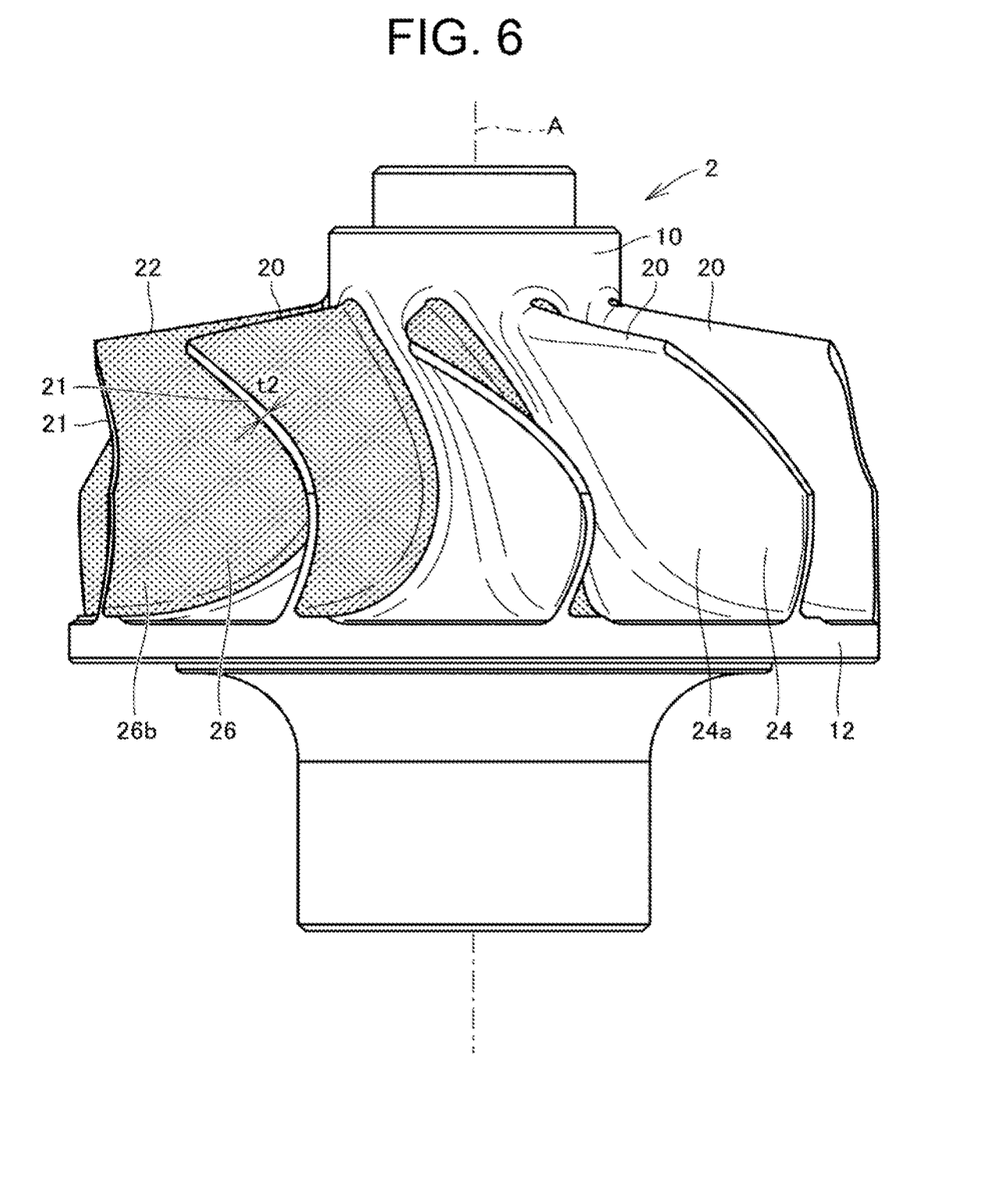
FIG. 6 is a view illustrating a modified embodiment of the portion on which the additional work is performed.

FIG. 6 is a view illustrating a second modified embodiment of the portion on which the additional work is performed. As illustrated in FIG. 6, in the additional work step, the additional work may be performed on all over the area of the protruding surface 26 of each of the blades 20 of the blank 1. The same goes for the case in which the additional work is performed on the recess surface 24 of the blade 20 of the blank 1 or both of the recess surface 24 and the protruding surface 26.

Third Modified Embodiment

When there is a chip in the outer edge etc. of each of the blades 20 of the blank 1 prepared in the blank preparation step, a cladding step in which the lack of the blade 20 is cladded may be provided before the additional work step.

Fourth Modified Embodiment

The method of manufacturing the TiAl alloy impeller 2 according to the present embodiment may further include a surface treatment step that follows the additional work step, and in which a fluorination treatment is performed on the surface of the TiAl alloy impeller 2 after the additional work. In this step, a fluoride film that has a thickness from 0.1 μm or more to 10 μm or less is formed on the surface of the TiAl alloy impeller 2 (at least the surface of each of the blades 20) by heating the TiAl alloy impeller 2 after the additional work at a specified temperature (from about 100° C. to 500° C.) for a specified time in fluorine-containing gas (including either one of $NF_3$, $BF_3$, $CF_4$, HF, $SF_6$, or $F_2$; or a mixture of combination of them in inert gas such as $N_2$) atmosphere. It is noted that maximum concentration of fluorine in the fluorine-containing gas atmosphere is set to a range from 2% to 35%.

When the surface of the TiAl alloy impeller 2 manufactured by going through the surface treatment step is oxidized, only the Ti is removed from a surface layer of the TiAl alloy impeller 2, and a uniform film of alumina ($Al_2O_3$) is formed on the surface layer. Thus, oxidation resistance of the TiAl alloy impeller 2 is improved. It is noted that when the surface of the TiAl alloy impeller 2 that does not have the fluoride film is oxidized, titanium dioxide ($TiO_2$) is generated on the surface layer of the TiAl alloy impeller 2.

It is noted that the embodiments disclosed here are to be considered in all respects as illustrative and not restrictive. The scope of the present invention is indicated by the claims rather than the description of the above embodiments, and all modifications that come within the meaning and range of equivalency of the claims are intended to be embraced therein.

REFERENCE SIGNS LIST 1 blank
2 TiAl alloy impeller
10 shaft portion
12 disc portion
20 blade
21 outer edge
22 one-side edge
24 recess surface
24a casting face
26 protruding surface
26a casting face
26b machined face
A rotational axis
B base straight line

The invention claimed is:

1. A method of manufacturing a TiAl alloy impeller that is used for a vehicle turbocharger comprising
   a blank preparation step in which a blank of the TiAl alloy impeller is prepared, the blank having a shaft portion configured to rotate around a rotational axis and a plurality of blades connected to the shaft portion, wherein an outer edge at an outer end of each of the plurality of the blades of the blank in a radial direction of the shaft portion is of a thickness set so as to be larger than a thickness of an outer edge of each of blades of the TiAl alloy impeller; and
   an additional work step in which an additional work is performed on each of the blades of the blank, wherein
   in the additional work step, the additional work is performed on only one of: a first surface of a portion of each of the blades that includes at least the outer edge or a second surface of the portions thereof, so as to make the outer edge thin in a circumferential direction, and after the additional work step, the additional work is not performed on the other one of the first surface or the second surface.

2. The method of manufacturing the TiAl alloy impeller according to claim 1, wherein
in the blank preparation step, the blank formed by precision casting is prepared.

3. The method of manufacturing the TiAl alloy impeller according to claim 2, wherein
in the additional work step, the additional work is performed on each of the blades so that at least a portion of the respective first or second surface of the blade after the additional work remains a casting surface.

4. The method of manufacturing the TiAl alloy impeller according to claim 1, wherein
in the blank preparation step, the blank formed by forging is prepared.

5. The method of manufacturing the TiAl alloy impeller according to claim 1, wherein
in the blank preparation step, the blank formed by metal injection molding is prepared.

6. The method of manufacturing the TiAl alloy impeller according to claim 1, wherein
in the blank preparation step, the blank formed by metal laser deposition prepared.

7. The method of manufacturing the TiAl alloy impeller according to claim 1, wherein
the first surface of each of the blades of the blank is a recess surface that is recessed so as to protrude in the circumferential direction of the shaft portion,
the second surface of each of the blades of the blank is a protruding surface that bulges so as to protrude in the circumferential direction of the shaft portion, and
in the additional work step, the additional work is performed on only the recess surface of the portion that includes at least the outer edge of each of the blades.

8. The method of manufacturing the TiAl alloy impeller according to claim 1, wherein
the first surface of each of the blades of the blank is a recess surface that is recessed so as to protrude in the circumferential direction of the shaft portion,
the second surface of each of the blades of the blank is a protruding surface that bulges so as to protrude in the circumferential direction of the shaft portion, and
in the additional work step, the additional work is performed on only the protruding surface of the portion that includes at least the outer edge of each of the blades.

9. The method of manufacturing the TiAl alloy impeller according to claim 1, wherein
each of the blades has a one-side edge that is located on one side in an axial direction of the shaft portion, and
the portion that includes at least the outer edge is, of each of the blades, a portion from the outer edge to a portion that is offset toward the shaft portion by one third of a length of the one-side edge from the outer edge.

10. The method of manufacturing the TiAl alloy impeller according to claim 1, wherein
each of the blades has a one-side edge that is located on one side in an axial direction of the shaft portion, and
the portion that includes at least the outer edge is, of each of the blades, a portion outward of a straight line in the radial direction of the shaft portion, wherein the straight line is parallel with the rotational axis, and extends through a portion of the one-side edge that is offset toward the shaft portion by a half of a length of the one-side edge in the radial direction of the shaft portion from the outer end of the blade in the radial direction of the shaft portion.

11. The method of manufacturing the TiAl alloy impeller according to claim 1, wherein
the additional work is a cutting work.

12. The method of manufacturing the TiAl alloy impeller according to claim 1, wherein
the additional work is an electrochemical machining.

13. The method of manufacturing the TiAl alloy impeller according to claim 1, further comprising,
a surface treatment step that follows the additional work step and in which a fluorination treatment is performed on the respective first or second surface of the TiAl alloy impeller after the additional work.

* * * * *